(12) United States Patent
Vijverberg et al.

(10) Patent No.: US 8,029,899 B2
(45) Date of Patent: Oct. 4, 2011

(54) COATED PARTICLES AND COATING COMPOSITIONS COMPRISING COATED PARTICLES

(75) Inventors: Cornelis Adrianus Maria Vijverberg, Halsteren (NL); Jan Andre Jozef Schutyser, Dieren (NL)

(73) Assignee: Nuplex Resins B.V., Bergen Op Zoom (NL)

( * ) Notice: Subject to any disclaimer, the term of this patent is extended or adjusted under 35 U.S.C. 154(b) by 748 days.

(21) Appl. No.: 11/919,477

(22) PCT Filed: Apr. 25, 2006

(86) PCT No.: PCT/EP2006/061826
§ 371 (c)(1),
(2), (4) Date: Apr. 22, 2008

(87) PCT Pub. No.: WO2006/114420
PCT Pub. Date: Nov. 2, 2006

(65) Prior Publication Data
US 2009/0286901 A1    Nov. 19, 2009

(30) Foreign Application Priority Data
Apr. 26, 2005  (EP) .................................... 05009103

(51) Int. Cl.
*C08K 9/00*      (2006.01)
*B05D 7/00*      (2006.01)
*B32B 5/16*      (2006.01)
(52) U.S. Cl. ........ 428/405; 428/357; 427/212; 427/219; 523/216; 516/104; 516/111
(58) Field of Classification Search .................. 523/201, 523/206, 212, 213, 216; 428/405, 357; 977/773; 524/492; 427/212, 219; 516/104, 111
See application file for complete search history.

(56) References Cited

U.S. PATENT DOCUMENTS

| | | | | |
|---|---|---|---|---|
| 5,066,558 A | * | 11/1991 | Hikake et al. .............. | 430/108.7 |
| 6,203,960 B1 | * | 3/2001 | Ciccarelli et al. .......... | 430/108.7 |
| 7,244,775 B2 | * | 7/2007 | Ilenda et al. ................ | 523/202 |
| 2002/0168524 A1 | * | 11/2002 | Kerner et al. ............... | 428/405 |

FOREIGN PATENT DOCUMENTS

| | | |
|---|---|---|
| EP | 0192304 A | 8/1986 |
| EP | 0832947 A | 4/1998 |
| EP | 0860478 A | 8/1998 |
| EP | 1046689 A | 10/2000 |
| EP | 1167455 A | 1/2002 |
| EP | 1236773 A | 9/2002 |
| EP | 1304361 A | 4/2003 |

OTHER PUBLICATIONS

"Silanes." Power Chemical Corporation. pp. 1-7, 1999.*
English Translation of EP 1 046 689.*
"International Search Report and the Written Opinion of the International Searching Authority", mailed Jul. 5, 2006, for PCT International Application No. PCT/EP2006/061826.
Sertchook, et al, "Composites Particles of Silica/Poly(Dimethylsiloxane)", Chemistry of Materials, vol. 17, pp. 4711-4716, 2005.

* cited by examiner

*Primary Examiner* — Vasu Jagannathan
*Assistant Examiner* — Hannah Pak
(74) *Attorney, Agent, or Firm* — Coraline J. Haitjema; David P. Owen; Hoyng Monegier LLP

(57) ABSTRACT

The invention relates to coated particles comprising particles and a crosslinked polysiloxane coating and to a process for the manufacture of said coated particles. Further, the invention relates to the use of the coated particles to improve surface properties of articles and to material compositions comprising the coated particles, in particular coating compositions. According to the invention there is provided coated particles comprising particles having a surface with hydroxy functional groups and a crosslinked polysiloxane coating comprising a reaction product of polysiloxane disilanol according to formula I:

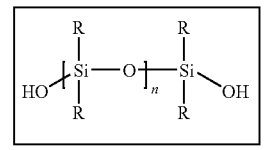

wherein n is 1 to 25, and wherein each R is a same or different hydrocarbon group, and a coating crosslinking agent, preferably an alkoxysiloxane having 3 or 4 alkoxy groups which polysiloxane coating is at least partly grafted to the particle surface by reaction with the hydroxy functional groups on the particles. The coated particles can be used to impart improved surface properties in particular in coatings.

20 Claims, No Drawings

COATED PARTICLES AND COATING COMPOSITIONS COMPRISING COATED PARTICLES

This application is a 35 U.S.C. §371 national phase application of International Application Number PCT/EP2006/061826, filed Apr. 25, 2006, and claims priority to European Patent Application No. 05009103.2, filed Apr. 26, 2005, the entire contents of which are incorporated by reference herein.

The invention relates to coated particles comprising particles and a polysiloxane coating and to a process for the manufacture of said coated particles. Further, the invention relates to the use of the coated particles to improve surface properties of articles and to polymer compositions comprising the coated particles, in particular coating compositions.

WO 01/09260 describes a coating composition comprising a film forming binder system (i.e. crosslinkable resin and crosslinking agent) and one or more polysiloxanes having at least one reactive functional group connected to an organic substituent on the polysiloxane, a plurality of particles and at least one curing agent comprising one or more functional groups that is reactive with any reactive functional group of the polysiloxane. The organic functional groups (e.g. alkylene hydroxyl groups) of the polysiloxanes react chemically with the crosslinking agent(s) of the coating composition such as aminoresins and polyisocyanates. It is described that due to the presence of the polysiloxane surfactant, the particles migrate to the surface of a coating during curing of the coating composition. The coating composition is used in a pigment-free top or clear coating composition for the finishing of articles, for example motorcycles, cars, trains, buses, trucks, and aeroplanes to provide a high scratch resistance. As stated in WO03-011992, a drawback of this invention is the high cost of those polysiloxane types having at least one reactive functional group and the poor re-coatability properties requiring that the coating composition must also contain acid adhesion promoters. A further disadvantage is that the relatively large amount of the polysiloxane required to significantly improve the scratch resistance implies a high risk of haze formation, which is particularly undesirable in clear coatings.

The object of the invention therefore is to provide particles in particular for coating compositions that provide a good scratch resistance without a risk of haze formation in a clear coating at a relatively low price.

According to the invention there is provided coated particles comprising particles having a surface with hydroxyl-functional groups and a crosslinked polysiloxane coating comprising a reaction product of polysiloxane disilanol according to formula I:

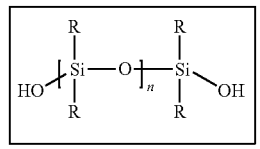

wherein n is 1 to 25, and wherein each R is a same or different hydrocarbon group, and a coating crosslinking agent which polysiloxane coating is at least partly grafted to the particle surface by reaction with the hydroxy functional groups on the particles and wherein the coating crosslinking agent is an alkoxysilane having the structure $[R'O]_m$—$Si$—$[R'']_{4-m}$ wherein m=3 or 4 and R' and R'' are hydrocarbon groups.

It was found that the coated particles according to the invention have excellent properties for use in coating composition to make pigment-free top coatings or clear coatings in the finishing of articles, for example motorcycles, cars, trains, buses, trucks, and aeroplanes. It was found that not only metal surfaces, but also plastic article surfaces can be coated with the coating compositions according to the invention. The polysiloxane disilanol is relatively inexpensive and the amount of polysiloxane coating on the particles required to achieve a good scratch resistance is relatively low, due to which the coated particles are relatively inexpensive. A further advantage of the coated particles according to the invention is that it is easier to refinish or recoat a coated article with a coating composition comprising the coated particles according to the invention. Easier means that, as opposed to the prior art, separate measures, pre-treatments or coating composition additives (such as borates) are not required to achieve a good reparability or second coat adhesion. It is considered that the excellent re-coatability is due to the relatively low amount of polysiloxane coating in the coated particles and the relatively low amount of coated particles required to achieve the desired level of scratch resistance. Another advantage is that the coated particles have improved hydrolytic stability causing improved durability of the coating composition containing the coating particles. Compared to prior art WO 01/09260, where the polysiloxanes are not grafted onto the nanoparticles, the scratch resistance is Improved without risking haze in the final coating.

EP 0832947 describes automotive clear coatings containing a film forming binder system (i.e. crosslinkable resin and crosslinking agent) having improved dry scratch resistance by the introduction of surface reactive inorganic microparticles (less than 1 micron in size). The surface of the microparticles such as colloidal silicas are made reactive by using one of a wide range of alkoxy silane coupling agents (e.g. carbamate or glycidoxy silanes) having a dual functionality permitting to link covalently the inorganic (particle) phase with the polymeric phase. However, to obtain an acceptable improvement of the dry scratch resistance, high loadings of nanoparticles are required, which has the disadvantage of high costs and causing brittleness. Further, it was found that the car wash scratch resistance is not significantly improved by these particles.

It was found that, as opposed to EP 0832947, the coated particles according to the invention migrate to the surface of a coating during curing of the coating composition. Because of this effect, only a relatively small amount of the coated particles is necessary in a coating composition to achieve a resistance improvement.

EP0860478 describes metal oxide fine particles, in particular fumed silica, that is surface modified by a polysiloxane for use as thickening agent, reinforcement filler or as powder flow improver. The modified particles are produced in a process wherein the at least partially agglomerated primary solid nanoparticles are first mixed in and reacted with a silane coupling agent and, after removal of solvent and by-product, reacted with an organopolysiloxane having reactive terminal groups. Because there is no coating crosslinking agent present during the reaction of the polysiloxane with the particles, the particles do not have a crosslinked polysiloxane coating. The prior art modified particles are not suitable for use in a coating composition for several reasons. In fact, this prior art document does not describe such use. The uncrosslinked coating on the prior art coated particles is not very compact and can easily swell in solvents and become rheological active. Further, because the metal oxide fine particles easily agglomerate and because the length of the described polysiloxanes is typically too high for application in clear coatings, the prior art particles will cause haziness and/or a relatively low scratch resistance improvement.

EP1236773 describes pyrogenic particles that are surface modified with Si containing organic compounds. The publication mentions a large number of suitable different Si compounds, including organosilanes and polysiloxanes. EP1304361 similarly describes the coating of silica with a specific siloxane. The problems and disadvantages of the modified particles in these publications are similar as described above for EP0860478.

EP 1046689 describes coating composition and resulting coatings comprising a polydialkoxysiloxane, a polysiloxane having reactive terminal groups a curing catalyst and a curing agent. The composition is used to provide a transparent non-wettable (water repellant) polysiloxane coating for example for car or airplane windows. The composition may optionally comprise colloidal silica. However, the publication does not describe coated particles. The coating composition cannot be used for improving surface properties in a polymer composition, in particular in a coating composition.

In principle, the coating crosslinking agent can be any compound suitable for crosslinking the polysiloxane disilanol compound, for example borates, titanates, phosphates and silanes. The coating crosslinking agent can react both with the hydroxyl functional groups on the particle surface and with the silanol groups of the polysiloxane disilanol resulting in a densely crosslinked compact polysiloxane coating layer which is grafted to the hydroxy functional groups on the particle surface. With coating crosslinking agent is meant an agent capable of crosslinking the polysiloxane to form a crosslinked polysiloxane coating. This implies that the coating crosslinking agent must comprise molecules having at least 3 reactive groups (as 2 reactive groups would only result in linear chain extension).

Very good results were obtained when in the coated particles according to the invention, the coating crosslinking agent is an alkoxysilane having the structure $[R'O]_m$—Si—$[R'']_{4-m}$ wherein m=3 or 4 and R' and R'' are hydrocarbon groups. The alkoxysilane has a very good reactivity towards the polysiloxane disilanol and towards the hydroxy groups on the surface of the particles, in particular when the particles are partially organic modified silica particles. A further advantage is that the coating crosslinking agent does not disturb the apolar nature of the coating. Further the coating formed is hydrolytically stable. In the alkoxysilane the hydrocarbon groups R' and R'' are preferably alkyl groups having one to eight, preferably one to four carbons. Particularly preferred coating crosslinking agents are tetraethoxysilane (TEOS) or tri(m)ethoxymethyl-(or ethyl)silane. Polydimethylsiloxane disilanol with a mean n of 3 to 4 and a weight % OH of 8.1 to 12.3 is commercially available from Dow Corning under the tradename DowCorning® 4-7041 INT short chain diol.

In practice, the coating crosslinking agent often is a mixture of molecules having a different number of reactive groups and comprising coating crosslinking agent molecules with 3 or 4 reactive groups and also molecules with 1 or 2 reactive groups. In that case, the average number of reactive groups per molecule must be more than 2, preferably more than 2.5. Preferably, the coating crosslinking agent often is a mixture of alkoxysilane as described above having an average number of alkoxy groups between 2.5 and 4.

To achieve a compact crosslinked coating the molar ratio of the coating crosslinking agent relative to the polysiloxane disilanol is preferably between 2 and 0.1, preferably between 1.5 and 0.8 and most preferably between 1.2 and 0.8.

Preferably, in the coated particles according to the invention, the polysiloxane disilanol has an average number of siloxane groups n between 1 and 10, preferably between 2 and 5. It was found that with such a low number of siloxane groups in the polysiloxane the risk of haziness in the coating is very low whereas the crosslinking efficiency and density in the coating is higher and the scratch resistance improvement efficiency is higher. With higher scratch resistance improvement efficiency is meant that a certain improvement can be realized with a lower amount of added coated particles. Preferably, in the coated particles according to the invention, the hydrocarbon R on the polysiloxane disilanol is a hydrophobic group, for example an alkyl, aryl or aralkyl group, preferably an alkyl having 1 to 4 carbon atoms. Most preferably, the polysiloxane disilanol is polydimethyl siloxane disilanol.

Not all hydroxy groups on the particle surface react with either the polysiloxane disilanol or the coating crosslinking agent. The hydroxy functional groups on the particles surface are preferably partially esterified with an alcohol. The advantage is that the coated particles are more hydrophobic and have higher scratch resistance improvement efficiency.

In the coated particles the particles preferably are nanoparticles having an average diameter between 1 and 400 nanometres. By an average diameter is meant: for a sphere shaped particle the diameter, for a plate shaped particle the thickness and for a needle shaped particle the cross-sectional diameter should be lower than 400 nm, being the lowest wavelength of the visible light. Nanoparticles are invisible in visible light and therefore can be used in a clear coating. Further, the nano particles more easily migrate to the surface of the coating where they are more effective for providing scratch resistance. In view of that, it is more preferred that the particles have an average diameter between 1 and 150 nanometres. Nanoparticles may form clusters. To prevent that such nanoparticles clusters become visible and cause haziness in the clear coating, it is most prefered that the nanoparticles have an average diameter between 1 and 50 nanometres.

One of the advantages of the present invention is that the coated particles comprise a relatively low amount of polysiloxane coating and nevertheless show good scratch resistance improvement efficiency. Typically, the weight fraction of particles in the coated particles is between 30 and 99 wt. % defined as the percentage of the weight of the particles (optionally esterified with an alcohol) relative to the total weight of said particles, coating crosslinker and polysiloxane. Good results could be obtained at a particle weight fraction of more than 50 wt %, preferably more than 60 wt % and even at more than 70 wt % and sometimes even 80 wt %. It was found that small particles need a higher amount of coating to achieve good scratch resistance improvement efficiency. Good results can be obtained with coated particles wherein the particles have an average diameter between 4 and 50 nanometres and the weight fraction is between 50 and 99 wt. %. Preferably, the particles have an average diameter between 5 and 40 nanometres and the weight fraction of the particles in the coated particles is between 50 and 97 wt. %, most preferably, the particles have an average diameter between 5 and 30 nanometres and the weight fraction of the particles in the coated particles is between 50 and 95 wt. %.

In a preferred embodiment the coated particles according to the invention comprising nanosilica particles have a surface with hydroxy functional groups, optionally partly esterified, and a polysiloxane coating comprising a reaction product of polysiloxane disilanol according to formula I:

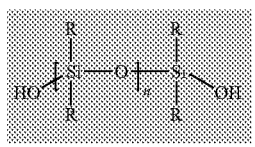

wherein n is 1 to 25, and wherein each R is a same or different hydrocarbon group having 1-4 carbon atoms, and as a coating crosslinking agent an alkoxysilane having the structure [R'O]$_m$—Si—[R"]$_{4-m}$ wherein m wherein m=3 or 4 (or a mixture of alkoxysilanes having an average number of alkoxy groups m between 2.5 and 4), and wherein R' and R" are hydrocarbon groups, which polysiloxane coating is at least partly grafted to the particle surface by reaction with the groups on the particles, wherein the molar ratio of the coating crosslinking agent relative to the polysiloxane disilanol is between 2 and 0.1, wherein the particles have an average diameter between 4 and 50 nanometres and wherein the weight fraction of the particles in the coated particles is between 50 and 99 wt. % (relative to the total weight of the coated article) and wherein the hydrocarbon on the polysiloxane disilanol is an alkyl having 1-4 carbon atoms.

The particles in the coated particles according to the invention are chosen in view of their intended application. The coated particles according to the invention can be used to bring the particles to the surface where it is more effective and due to which a more efficient use can be made of the coated particles (smaller amount needed for the same effect level) without risk of haziness in a clear top coating. The particles may possess properties or contain compounds to protect the polymer matrix against weathering, abrasion, UV radiation, oxidation, dirt, graffiti or may contain compounds that need to be accessible from the outside, for example pigments or marking compounds like laser marking compounds. The particles may contain compounds with high refractive indices to increase reflection, or low reflection to reduce reflection. The particles may be organic or inorganic. To improve scratch resistance the particles preferably are inorganic nanoparticles, preferably chosen from the group of silica, alumina, zirconia, titania, an inorganic oxide core of one type on which is deposited an inorganic oxide of another type, hybrids and/or mixtures thereof, glass, mineral or synthetic clay, zeolite and organic particles having hydroxyl groups on the surface of the particle. The inorganic nanoparticles suitable for coating compositions of the present invention preferably are essentially colorless to not seriously interfere with the light transmissive characteristics of the coating compositions when unpigmented.

In view of obtaining a high scratch resistance and car wash resistance in a coating, the particles in the coated particles preferably are silica particles. A further advantage of silica particles is that the polysiloxane disilanol is bonded to the silica particles over an [—Si—O—Si—] bond which is very hydrolytically stable. It was found that the polysiloxane disilanol is well grafted onto the silica particles. This is believed to be due to the good reactivity of a silanol group towards another silanol, in particular compared to the relatively low reactivity of a silanol group with a carbon hydroxyl group. A particularly preferred class of inorganic nanoparticles for compositions of the present invention are sols of silicas having an average particle diameter ranging from about 1 to about 150 nanometers (nm), preferably from about 1 to about 100 nm, and most preferably from about 3.5 to about 50 nm.

The invention further relates to a particularly preferred method for the preparation of coated particles according to the invention wherein a polysiloxane coating is grafted onto particles by reacting, at elevated temperature, particles in an aprotic organic colloidal dispersion with
a) a polysiloxane disilanol according to formula I:

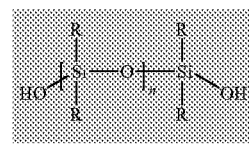

wherein n is 1 to 25, and wherein each R is a same or different hydrocarbon group and b) a coating crosslinking group, preferably an alkoxysilane having the structure [R'O]$_m$—Si—[R"]4-$_m$ wherein m=3 or 4 and R' and R" are same or different hydrocarbon groups.

The advantage of this method is that the particles are very homogeneously distributed in the dispersion without agglomeration and concomitant haziness in the dispersion and/or in the resulting coating.

Organic modified particles in an aprotic organic colloidal dispersion (hereinafter an 'organosol') are commercially available. If it is not available that it can be prepared by replacing in a protic organosol, for example an ethoxylated particle dispersion in ethanol, the protic solvent with an aprotic solvent-, for example by distillation. In the method according to the invention the organic modified particles in an aprotic organic colloidal dispersion are preferably produced in a process comprising the steps of:

a) Providing particles dispersed in water (hereinafter an 'aquasol'), b) Adding to the aquasol an organic reactant to react at least a part of the hydroxy functional groups on the surface of the particles to form organic modified particles;

c) Providing to the organic modified particles an aprotic organic solvent to create an aprotic organic colloidal dispersion (hereinafter an 'organosol').

d) removing water during and/or after step b) and/or c).

In step (b), the nanoparticles are brought in the form of a colloidal dispersion with a reactant. Preferably the hydroxy functional groups on the surface of the particles are at least partly esterified with an alcohol, preferably a lower monohydric alcohol, preferably methanol, ethanol, n-propanol, n-butanol. The hydrophilic particles are thus converted to hydrophobic particles to create a stable dispersion in an organic medium.

Techniques for preparing such dispersions of colloidal silica in alcohols are known. Such colloidal dispersions can be prepared by controlled addition of an aqueous silica sol to the alcohol and preferably simultaneously removing water for example by an azeotropic distillation at a temperature at least sufficiently high to effect to some extent a chemical reaction between the hydroxyl groups of the alcohol and hydroxyl groups on the particles, preferably, in case the particles are silica, of the silanol groups (Si—OH) of the colloidal silica. The products are sometimes referred to as alcosols and contain (silica) particles having chemically modified surfaces. Another method to partially esterify with monoalcohol is to use dialkoxy ketals such as dimethoxypropane to convert nanosilica aquasol into an organosol comprising alcohol and ketones as liquid carrier.

In step c) an aprotic solvent is provided, which preferably is higher boiling than the reactant (preferably alcohol and optionally second low boiling reactant). The (protic) reactant is preferably exchanged by distillaton with the aprotic solvent to a residual amount of preferably less than 10 wt. %, preferably less than 5 wt %, more preferably less than 2 wt. % to prevent undesired reaction between the protic reactant and the hydroxy functional groups on the particles or the coating crosslinking agent, in particular the alkoxysilane groups.

Preferred aprotic solvents are ketones (e.g. 2-heptanone), butylacetate, xylene, all boiling at higher temperature than the applied reactant. In view of the boiling point requirement, preferably an alcohol is used containing at most 4 carbon atoms. The aprotic solvent is chosen in view of providing a good compatibility and hence good colloidal stability of the esterified nanosilica, and furthermore in view of permitting in the second step a further dramatization with siloxane and silanes without loss of the colloidal stability. In this context 2-heptanone appeared to be very suitable aprotic solvent.

To the colloidal organosol of silica a polysiloxane disilanol, preferably polydimethylsiloxane disilanol, is added together with coating crosslinking agent, preferably an alkoxy silane as described above and optionally a catalyst, preferably dibutyltindilaurate to promote at elevated temperature condensation reaction of the silanol (Si—OH) and Si-alkoxy. The reaction between the particles, the coating crosslinking agent and the polysiloxanes disilanol is carried out under heating the mixture preferably between 40 and 150° C., during which alcohol is removed. At the end of the reaction a part of the aprotic solvent can be removed in order to concentrate the obtained colloidal dispersion. The weight fraction of particles on the total weight of the coated particles is at least 50%.

The silica sols in an aqueous medium (also referred to as hydrosols, aquasols or colloidal silica) may be prepared for example by partially neutralizing an aqueous solution of an alkali metal silicate, usually sodium silicate, with acid to a pH typically of about 8 to about 9 such that the resulting sodium content of the solution usually is less than about 1 percent by weight based on sodium oxide. A somewhat different, less common approach involves reacting the aqueous sodium silicate solution with sufficient acid to make an acidic sol and precipitating the sodium salt in a strongly acidic medium. This alternative approach makes use of the property that polysilic acid is temporarily stable at about a pH of 2, and if the sodium salt of the acid used for neutralizing the sodium silicate is sufficiently insoluble, it can be precipitated and separated. Once the salt is separated from the acidic sol, the sol can be alkalinized to grow colloidal particles and stabilize the product or can be employed in other known processes of growing silica particles to the desired size.

Aquasols of silica, also referred to as colloidal silica, are preferred starting materials for the preparation of coated silica particles according to the invention. The colloidal dispersions are marketed for instance by Akzo Nobel under the trade names Bindzil and Nyacol. Especially the Nyacol 2034 DI appeared in the invention to be excellently applicable. This Nyacol 2034 DI is an opalescent aquasol of nanosilica with a solid content of 34% and a pH of 2.5. Specific surface area is 180 to 200 m$^2$/g; particle range is 10 to 20 nm with a mean diameter of 16 nm. As on silica 4.6 Silanol groups per nm$^2$ are expected, one calculates that about 1.45 mmols of silanol groups/per g of solid nanosilica are present at the surface.

Silica sols having uniform spherical silica particles of controlled particle size can also be prepared by hydrolyzing a lower alkoxysilane like tetraalkyl-orthosilicate in an alcohol medium containing suitable amounts of water and ammonia. This method has been described by Stober et al in the JOURNAL OF COLLOID AND INTERFACE SCIENCE, Volume 26, pages 62-69 (1968) the disclosure of which is hereby incorporated by reference.

The invention further relates to coated particles obtainable by the above described method, to colloidal dispersion of coated particles, in particular to a coated colloidal silica particle dispersion. It is a particular advantage of a colloidal dispersion of modified nanoparticles that it can be easily converted to a coating composition without risk of agglomeration of the particles. For example, in a preferred embodiment, a colloidal dispersion of coated particles is "cold-blended" with a solution of a crosslinkable binder to a long term stable colloidal dispersion with a clear to opalescent appearance. This dispersion can at due time be further formulated with crosslinking agent, further solvent and additives to form a coating composition.

The invention also relates to the use of coated particles according to the invention in a polymer composition and, in particular relates to a polymer composition comprising a polymer material and coated particles according to the invention. The polymer material can be a thermoplastic polymer (i.e. a not crosslinkable polymer) but preferably is a cross linkable polymer in view of the film forming properties. The invention more in particular relates to a coating composition comprising a polymer binder system, a crosslinking agent, and coated particles according to the invention.

The polymer binder system preferably is a solvent borne coating composition, but can also be an aqueous emulsion or dispersion of a polymer binder material, optionally with a crosslinking agent, or powder coating composition. In particular, the invention relates to a clear coating composition comprising essentially no pigments for making a clear top coating finish or refinish. Essentially no pigments implies less than 10, preferably less than 5, more preferably less than 2 and most preferably less than 1 wt. % of pigments (relative to total solids in the coating composition).

Good results can be obtained if the coating composition according to the invention comprises between 0.1 and 20 wt. % of the coated particles (relative to the total weight of solids in the coating). Preferably, the coating composition comprises between 0.1 and 15 wt. %, more preferably between 0.1 and 10 wt. %, even more preferably between 0.1 and 7 wt % and most preferably between 0.1 and 5 wt. % coated particles according to the invention. Good results can even be obtained at very low amounts below 3 wt. % or even below 2 wt. %.

The film forming binder system preferably contains a crosslinkable resin and a crosslinker. The crosslinkable resin may be any crosslinkable resin suitable for use in an essentially solvent-based, organic coating composition. Often such crosslinkable resins are referred to as "thermosetting resins". As used herein, the term "crosslinkable resin" is intended to include not only resins capable of being crosslinked upon application of heat but also those resins which are capable of being crosslinked without the application of heat. Examples of such crosslinkable resins include the generally known thermosetting acrylics and polyesters containing one or more functional groups selected from hydroxyl groups, carbamate groups, epoxy groups, carboxylic groups, anhydride groups and mixtures of any of the foregoing.

Acrylic resins refer to the generally known addition polymers and copolymers of acrylic and methacrylic acids and their ester derivatives, acrylamide and methacrylamide, and acrylonitrile and methacrylonitrile.

Polyester resins are generally known and are prepared by conventional techniques utilizing polyhydric alcohols and polycarboxylic acids. Moreover, polyesters are intended to include polyesters modified with fatty acids or glyceride oils of fatty acids (i.e. conventional alkyd resins).

Nonlimiting examples of suitable crosslinkable resins are any polyhydroxy group-containing polymer conventionally used in amino resin (i.e. 1K formulations) and/or polyisocyanates crosslinkable coating (2K) compositions.

Particularly suitable polymer materials include polyols, hydroxy-functional acrylic resins containing pendant or terminal hydroxy functionalities, hydroxy-functional polyester resins containing pendant or terminal hydroxy functionalities, hydroxy-functional polyurethanes, polyurethane-modified polyester polyols, polyurethane-modified polyacrylate polyols, and mixtures thereof. The polyhydroxy group-containing polymer contains on average at least two, and preferably more than two, hydroxy groups per molecule. Preferred polyhydroxy group-containing polymers are those with an acrylic or polyester backbone.

The polyhydroxy group-containing polymers preferably have weight average molecular weights of at least 1,000 to about 2,000,000. Usually, the weight average molecular weight is between 2,000 and 1,000,000, more preferably between 2,000 and 800,000, and most preferably between 2,500 and 100,000. The weight average molecular weight depends on the application requirements, and methods to modify the molecular weight accordingly are known to the skilled man.

Preferably, the coating composition comprises a polymer having a hydroxy number of 20 to 300 mg KOH/g polymer and more preferably of 60 to 200 mg KOH/g polymer. Such polyhydroxy-containing polymers are commercially available.

The coating composition may also comprise an epoxy-functional binder and a polyacid cross-linker reactive with the epoxy groups. Epoxy resins are generally known and refer to compounds or mixtures of compounds containing more than one 1,2-epoxy group. The polyepoxides may be saturated or unsaturated, aliphatic, cycloaliphatic, aromatic or heterocyclic.

The coating composition may also comprise a carbamate functional binder and a melamine cross-linker reactive with the carbamate groups. Carbamate functional groups can be incorporated into the polymer binder material by copolymerizing, ethylenically unsaturated monomers with a carbamate functional vinyl monomer such as a carbamate functional alkyl ester of methacrylic acid. Carbamate resins and their manufacture are generally known and refer to compounds or mixtures of compounds containing more than one carbamate group. U.S. Pat. No. 3,479,328 is incorporated herein by reference. Also, hydroxyl functional acrylic polymers can be reacted with isocyanic acid to provide pendent carbamate groups. Likewise, hydroxyl functional acrylic polymers can be reacted with urea to provide pendent carbamate groups.

When desired, generally known crosslinking agents can be incorporated in a composition of the invention particularly when the crosslinkable resin comprises a thermosetting resin containing active hydrogen functionality. As will be appreciated by one skilled in the art, the choice of crosslinking agent depends on various factors such as compatibility with the film-forming resin, the particular type of functional groups on the film-forming resin and the like. Representative examples of crosslinking agents include blocked and/or unblocked diisocyanates, poly-isocyanates, diepoxides, aminoplasts, tris-alkoxycabonyltriazines carbamates, cyclic carbonate groups, and anhydride groups. Examples of such compounds for 1K (i.e. 1 pack) formulations with hydroxy containing binders include melamine formaldehyde resin (including monomeric or polymeric melamine resin and partially or fully alkylated melamine resin)

The aminoplast contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol. For instance Setamine® US 138 BB-70 is a butylated formaldehyde/melamine resin ex Nuplex Resins. Further useful crosslinking agents are polymeric melamine is which are at least partly etherified with methanol and mixed ethers with methanol or ethanol or with (iso)butanol. For 2K (i.e. 2 pack) formulations polyisocyanates are usually applied. E.g. Tolonate HDT LV (ex Rhodia) is a commercially available polyisocyanate.

In the coating composition, the most preferred polymer binder is a hydroxyl functional acrylic polymer in combination with a cross-linking agent, preferably and isocyanate, aminoplast or melamine.

Optionally the coating compositions can comprise other additives like catalysts, sag control agents, UV-absorbers, flow enhancers, film formation improvers, such as wetting and levelling agents, etc. In a preferred embodiment, the coating composition according to invention further comprises a sag control agent, preferably reaction products of (poly)isocyanates and monoamines as disclosed in e.g. NL7613121 and EP192304. In a preferred embodiment of the invention it is found that when the coated particles according to the invention are combined with sag control agents, preferably the reaction products of (poly)isocyanates and monoamines, the stability (shelf life) of the resulting coating composition increases, probably due to the reduced mobility of the particles under very low shear conditions. Although, it might be expected that, when mixing coated particles according to the invention with sag control agents, a reduction of functionality and/or efficiency occurs for the coated particles and maybe also for the sag control agent, it was found that the coated particles according to the invention are advantageous because they are not severely hindered by sag control agents, in particular the above-mentioned reaction products of (poly)isocyanates and monoamines.

The coating compositions may include a suitable known catalyst or a blocked catalyst to enhance the cure reaction. The catalyst is present in an amount sufficient to accelerate the reaction. The catalyst can be present, when added to the other components which form the coating composition, in an amount ranging from 0.1 to 5.0 percent by weight, and is typically present in an amount ranging from 0.5 to 1.5 percent by weight based on the total weight of the resin solids of the components which form the coating composition.

In another embodiment, additional components can be present during the formation of the coating compositions as previously described. These additional components include, but are not limited to, flexibilizers, plasticizers, levelling aids (such as, for example polyacrylates marketed by Byk Chemie under e.g. the tradename Byk 358), thixotropic agents, anti-gassing agents, organic co-solvents, flow controllers, hindered amine light stabilizers, anti-oxidants, UV light absorbers, coloring agents or tints, and similar additives conventional in the art, as well as mixtures of any of the foregoing can be included in the coating composition. These additional ingredients can present, when added to the other components which form the coating composition, in an amount up to 40 percent by weight based on the total weight of the resin solids of the components which form the coating composition.

The coating composition of the invention may comprise an organic solvent as it is desirable that the composition is in a sufficiently low viscous liquid state enabling e.g. easy spraying. Examples of useful organic solvents include methyl ethyl ketone, methyl isobutyl ketone, 2-heptanone, n-amyl acetate, ethylene glycol butyl ether acetate, propylene glycol monomethyl ether acetate, xylene, n-butylacetate, n-butanol, or blends of aromatic hydrocarbons like Solvesso 100. The solvent may be present in an amount of preferably less than 60 weight percent, and more preferably of at most about 50 weight percent.

The coating compositions of the present invention can be solvent-based coating compositions, water-based coating compositions (such as water borne secondary emulsions), or in solid particulate form, a powder coating composition, or in the form of a powder slurry or aqueous dispersion. The components of the present invention used to form the cured compositions of the present invention can be dissolved or dispersed in an organic solvent. Suitable powder clearcoats are described in U.S. Pat. No. 5,663,240, which is incorporated herein by reference, and include epoxy functional acrylic copolymers and polycarboxylic acid curing agents. Further coating compositions of the invention can be non solvent-based but in the liquid form coating composition such as UV curable acrylated resins or monomers and peroxide curable unsaturated (maleic anhydride) based polyesters/styrene blends.

Said coating compositions according to the invention after curing yield clear films with high film hardness, good polishability, good resistance to water and organic solvents, good durability, and good acid etch resistance. A major advantage of the coated particles according to the invention in the cured clear films is that the dry and/or the wet scratch resistance are significantly improved with low amounts of coated particles, even as low as below 5 wt. %; even sometimes with only a very small amount of coated particles of below 2 wt. %. The enrichment of the nanoparticles at the surface appears to play an important role on the scratch resistance. The coated particles according to the invention can further be produced from relatively inexpensive silicium containing compounds (Polydimethylsiloxane disilanol and preferably the tetra-alkoxy silane). An extra advantage is that the recoating of a cured coating with the same coating composition shows no visual problem like dewetting. Probably this is the result of the effective grafting of the silicium compounds on the nanoparticles with the weight ratio of silicium compounds relative to silica being less than 50%.

The curable coating compositions according to the present invention have utility in coatings, such as automotive coatings, general industrial coatings, baked enamels, and wood finishes. They are also usable as molding and adhesive compositions and for coating optical data storage devices. Especially the invention relates to the use of said coating composition as a pigment-free top coat or a clear coat in the finishing and refinishing of articles, for example knobs, handle, switches and the like, motorcycles, exteriors and interiors of cars, trains, buses, trucks, and aeroplanes. Also in solid topcoats including pigments the curable compositions are applicable.

The composition of the invention is applicable as a clear and/or colorless coating composition over a pigmented base coat as part of a composite color-plus-clear coating. Such composite coatings are popular for their depth of color and liquid glossy surface appearance. They have found particularly wide acceptance in the field of automotive coatings.

The coating compositions of the present invention can be coated on the article by any of a number of techniques well-known in the art. These include, for example, spray coating, dip coating, roll coating, curtain coating, and the like. For automotive body panels, spray coating is preferred. After contacting the substrate and the coating composition, the solvent is allowed to partially evaporate to produce a uniform coating on the substrate. Subsequently, the compositions can be subjected to conditions to cure the coating layers.

Various methods of curing may be used depending on the type of crosslinking chemistry and type of application. For instance, for automotive heat curing is effected by exposing the coated article to elevated temperatures provided primarily by radiative heat sources. Curing temperatures will vary depending on the aminoplast or polyisocyanate and functional polymer used; however, they generally range between 70° C. and 190° C. and are preferably between 110° C. and 160° C., most preferably between 125° C. and 150° C. The curing time will vary depending on the particular components used and physical parameters such as the thickness of the layers; however, typical curing times range from 15 to 60 minutes. For car refinishes where polyisocyanate as crosslinker is mostly applied, forced drying conditions e.g. at 60° C. for 20 up to 60 minutes and a 7 day period at ambient temperatures are normal curing conditions.

The present invention is elucidated by means of the following non-limiting Examples.

Coating compositions were spray applied to electro-coated steel panels or Q-panels coated with a commercial primer and a commercial dark blue base coat. The base coat was applied in two layers with a 1 minute flash-off between the layers. The coating composition was applied after 5 minutes flash-off, also in two layers. After 10 minutes flash-off the complete system was baked for 30 minutes at 140° C.

Gloss was measured in a conventional way using a Dr. Lange glossmeter LMG 070 or a Byk Haze-Gloss 4601 glossmeter (reference is made to ISO 2813). Gloss is expressed in Gloss units (GU) and haze in Haze units (HU). The gloss of a clear coat depends amongst other parameters (such as orange peel and unevenness) on the binder cross-linker system. For most practical purposes 2K systems based on isocyanates as cross-linkers should have a 20° gloss of 85 GU or higher, whereas 1K systems based on melamine cross-linkers normally have a 20° gloss of 90 GU or higher. The haze of a clear coat should be as low as possible. The haze should be less than 40 HU, more preferably less than 20 and most preferably less than 15 HU.

The car wash resistance was determined with the aid of a mini-car wash device according to Renault specification RNUR 2204-C.R. PO No. 2204. In this test the coated panel is subjected for 10 minutes to a rotating washing brush similar to the ones used in a commercial car wash. During this operation a slurry of aluminium oxide paste Durmax 24H from Prolabo Paris is continuously sprayed over the panel. The loss of gloss is taken as a measure of the car wash resistance. The Observed Loss of Gloss is defined as follows: Observed Loss of Gloss=(initial gloss−final gloss)/initial gloss*100%. The initial gloss is defined as the gloss of the cured coating before the car wash test. The Final gloss is defined as the gloss of the cured coating after the car wash test. Gloss was measured in accordance with ISO 2813 using a Haze Gloss apparatus from Byk Gardner GmbH. The time elapsed between the car wash test and the loss of gloss measurement was about 1-3 hours. All samples were stored at room temperature between the car wash test and the gloss measurement.

The Rota Hub method was developed by Bayer Ltd, Germany, to, measure the scratch resistance under dry conditions. The gloss data were obtained with a reflectometer from Byk-Gardner. The parameters for the scratch tests are the following: Speed in X and Y direction Vx/Vy=15/15 mm/min; Speed of rotation w=5.0 U/s; Disc radius r=35 mm; Rub material: copy paper The gloss 20° is determined before and after scratch.

The mar or scratch resistance under dry conditions was also tested using the crockmeter. A 50 mm×50 mm square of 3M polishing paper (grade 281Q, 9 micron) was placed over a similar size of felt with the abrasive side of the polishing paper facing outward. The two squares are mounted over the finger of the mar tester. A ring clamp was used to secure the two squares on the finger. The 20° gloss of the test surfaces was measured before the test and then the test surfaces were subjected to ten double rubs. After the test the 20° gloss of the abraded area was measured in a direction parallel to the rubbing stroke of the mar tester. The mar resistance is expressed as percentage gloss retention.

Colloidal Dispersions of Monoalcohol Esterified Nanosilica

Preparation A. Methyl-nanosilica in 2-Heptanone 200 g of Nyacol2034 DI containing 34 weight % of colloidal silica, with a mean diameter of 16 nm, in water was mixed with 900 g of dimethoxypropane and stirred overnight at room temperature. The following day the nearly clear solution was concentrated under reduced pressure at room temperature by distilling off acetone and methanol until a mass of 300 g. After adding 250 g of 2-heptanone the acetone and the methanol were further removed from the mass until a weight of 300 g was reached. For a last time 250 g of heptanone was then added and the mass was concentrated to 300 g opalescent dispersion under reduced pressure and some heating. The solid content found after 1 hour at 140° C. was 23.40%. With elemental analysis the carbon content of the dried methyl-silica was determined to be 0.94% indicating that the silanol groups were partially converted into methoxy-silicium groups.

Preparation B. Butyl-nanosilica in 2-heptanone 100 g of Nyacol2034 DI was brought together with 300 g of ethanol and 200 g of n-butanol. From the mixture water was azeotropically removed by distillation under reduced pressure at 30° C. until a mass of 150 g of the colloidal dispersion was reached. 150 g heptanone was then added and the mass was again concentrated to 150 g. Once more the same operation was performed to get a bluish colloidal dispersion of butyl-silica in 2-heptanone with a solid content (after 1 hour at 140° C.) of 22.7%. With elemental analysis the carbon content of the dried methyl-silica was determined to be 1.5% indicating that the silanol groups were partially converted into butoxy-silicium groups.

Preparation C. Butyl-nanosilica in 2-heptanone 210 g of Nyacol® XP071 DI (aquasol with 37.8% of nanosilica) was brought together with 600 g of ethanol and 400 g of n-butanol. From the mixture water was azeotropically removed by distillation under reduced pressure (180 mbar) under inert nitrogen atmosphere (5 liter/hour) at 50° C. until a mass of 478 g of the colloidal dispersion was reached. Then 300 g of heptanone was added and 315 g of the mass was again distilled off at about 60 mbar. Once more 300 g of heptanone was added and 363 g of the mass was distilled off at about 40 mbar. The solution was filtered to get a clear pale yellow colloidal dispersion of butyl-silica in 2-heptanone with a solid content (after 1 hour at 125° C.) of 18.9%.

Preparation D. Butyl-nanosilica in 2-heptanone 210 g of Nyacol® XP073DI (aquasol with 38.7% of nanosilica) was brought together with 600 g of ethanol and 400 g of n-butanol. From the mixture water was azeotropically removed by distillation under reduced pressure (180 mbar) under an inert nitrogen atmosphere (5 liter/hour) at 50° C. After 715 g was distilled off, 300 g of heptanone was added and 340 9 of the mass was again distilled off at about 60 mbar. Once more 300 g of heptanone was added and 396 g of the mass was distilled off at about 40 mbar. The solution was filtered to get a clear pale yellow colloidal dispersion of butyl-silica in 2-heptanone with a solid content (after 1 hour at 125° C.) of 22.2%.

Colloidal Dispersions of Nanosilica Modified with a Blend of α, Ω-silanol Terminated Polydimethylsiloxane (=PDMS) and Tetra-alkoxy Silane

EXAMPLE AA

Methyl-nanosilica Grafted with PDMS and Tetraethoxy Silane 120 g of the methyl-nanosilica product made in Preparation A was mixed with 5.48 g of Dow Corning® DC 4-7041 short chain diol (i.e. Polydimethylsiloxane disilanol with a mean n of 3 tot 4 and a weight % OH of 8.1 to 12), 3.40 g of tetraethoxysilane (coating crosslinking agent) and 3.0 g of 2% solution of dibutyltindilaurate (catalyst) in 2-heptanone. After heating overnight at 45° C. the mixture was concentrated by distilling off the alcohol and partly the 2-heptanone. After filtration over a paper filter 98 g of colloidal dispersion of modified nanosilica was obtained. The solid content (after 1 hour at 140° C.) was 30.9%

EXAMPLE BB

Butyl-nanosilica Grafted with PDMS and Tetraethoxy Silane 119.1 g of the butyl-nanosilica product made in Preparation B was mixed with 5.48 g of Dow Corning® DC 4-7041 short chain diol, 3.41 g of tetraethoxysilane, 0.9 g 2-heptanone and 3.0 g of 2% solution of dibutyltindilaurate in 2-heptanone. The mixture was stirred and heated at 130 to 135° C. for about 2 hours. Then the mixture was cooled down to 80° C. and ethanol and partially the 2-heptanone were removed under reduced pressure at 80° C. After cooling down the mass was filtrated over a paper filter to remove some solid material and 96 g of a clear colloidal dispersion of modified nanosilica was obtained. The solid content (after 1 hour at 140° C.) was 31.2%

Colloidal Dispersions of Nanosilica Modified with a Blend of α, Ω-silanol Terminated Polydimethylsiloxane (PDMS) and Methyltrialkoxy Silane

EXAMPLE EE

Butyl-nanosilica Grafted with PDMS and Methyltrimethoxy Silane 130.6 g of the butyl-nanosilica product made in Preparation C was mixed with 5.31 g of Dow Corning® DC 4-7041 short chain diol, 2.90 g of methyltrimethoxysilane and 2.8 g of 1.8% solution of dibutyltindilaurate in 2-heptanone. The mixture was stirred under inert nitrogen atmosphere (5 liter/hour) and heated at 125° C. for about 1 hour. Then the mixture was cooled down to 75° C. and ethanol and partially the 2-heptanone were removed under a reduced pressure of 70 mbar at 60° C. After cooling down the mass was filtered over a paper filter to remove some solid material and 89.7 g of a clear pale yellow colloidal dispersion of modified nanosilica was obtained with a solids content (1 hour at 125° C.) of 28.9%

EXAMPLE FF

Butyl-nanosilica Grafted with PDMS and Tetraethoxy Silane (TEOS) (Ratio Butyl-Nanosilica:(PDMS+TEOS)=75:25)

128.0 g of the butyl-nanosilica product made in example D was mixed with 7.2 g of Dow Corning® DC 4-7041 short chain diol, 2.26 g of tetraethoxy silane and 3.22 g of 2.2% solution of dibutyltindilaurate in 2-heptanone. The mixture was stirred under inert nitrogen atmosphere (5 liter/hour) and heated at 125° C. for about 1 hour. Then the mixture was cooled down to 75° C. and ethanol and partially the 2-heptanone were removed under a reduced pressure of 70 mbar at 60° C. After cooling down the mass was filtered over a paper filter to remove some solid material and 95 g of a clear pale yellow colloidal dispersion of modified nanosilica was obtained with a solids content (1 hour at 125° C.) of 31.0%

EXAMPLE GG

Butyl-nanosilica Grafted with PDMS and Tetraethoxy Silane (Ratio Butyl-Nanosilica: (DC 4-7041+TEOS)=90:10)

115.0 g of the butyl-nanosilica product made in example D was mixed with 1.73 g of Dow Corning®DC 4-7041 short chain diol, 1.08 g of tetraethoxy silane and 3.22 g of 2.2% solution of dibutyltindilaurate in 2-heptanone. The mixture was stirred under inert nitrogen atmosphere (5 liter/hour) and heated at 125° C. for about 1 hour. Then the mixture was cooled down to 75° C. and ethanol and partially the 2-heptanone were removed under a reduced pressure of 70 mbar at 60° C. After cooling down the mass was filtered over a paper filter to remove some solid material and 88 g of a clear pale yellow colloidal dispersion of modified nanosilica was obtained with a solids content (1 hour at 125° C.) of 29.5%

EXAMPLE HH

Butyl-nanosilica Grafted with α, Ω-silanol Terminated Polydimethylsiloxane from Aldrich and TEOS 48.12 g of the butyl-nanosilica in MAK made as described in Preparation B, with a solid content of 23.9 w/w % (after 1 hour at 140° C.) was mixed with 1.38 g of Aldrich PDMS (i.e. Polydimethylsiloxane disilanol with an Mn of 700, an average n of about 7 and being a colorless liquid with a viscosity of 30 cSt), 0.53 g of tetraethoxysilane (b.p.=165°), 11.88 g 2-heptanone and 1.14 g of 2% solution of dibutyltindilaurate in 2-heptanone. The mixture was stirred and heated at 120 to 125° C. for about 2 hours. Then the mixture was cooled down to 80° C. and ethanol and partially the 2-heptanone were removed under reduced pressure at 80° C. After cooling down, the mass was filtrated over a paper filter to remove some solid material and 40 g of a clear colloidal dispersion of modified nanosilica was obtained. The solid content (after 1 hour at 140° C.) was 29%.

Comparative Experiment CC. Reaction Product of α, Ω-silanol Terminated Polydimethylsiloxane (=PDMS) with Tetra-alkoxy Silane in the Absence of Particles Comparative Experiment CC 120 g of 2-heptanone was mixed with 5.48 g of Dow Corning® DC 4-7041 short chain diol, 3.41 g of tetraethoxysilane and 3.0 g of 2% solution of dibutyltindilaurate in 2-heptanone. The mixture was stirred and heated at 130 to 135° C. for about 2 hours. Then the mixture was cooled down to 80° C. and ethanol and partially the 2-heptanone were removed under reduced pressure at 80° C. After cooling down 93.1 g of a clear solution of polydimethylsiloxane reaction product was obtained with a found solid content (after 1 hour at 140° C.) of 3.0%.

Comparative Experiment DD: Colloidal Dispersions of Nanosilica Treated with a Carbamate Functional Silane (Example 1 of U.S. Pat. No. 5,853,809)

Comparative Experiment DD

The Carbamate Silane Coupling Agent was first made by the dropwise addition of 59 g of hydroxypropylcarbamate (i.e. Carbalink HPC from Huntsman) in 7 g of 2-heptanone to a mixture of 124 g 3-isocyanatopropyl-triethoxysilane, 96 g of 2-heptanone and 2 g of a 4% dibutyltindilaurate solution in 2-heptanone heated at 40° C. At the end of addition the mixture was stirred further at 40° C. for 2 hours and at 60° C. for 3 hours until the isocyanate conversion was determined to be 99%. 7 g of methanol was finally added to kill any residual isocyanate groups. The solid content of the Carbamate Silane Coupling agent solution was 48%.

100 g of the organosol prepared in the Preparation A, 100 g of 2-heptanone and 4.8 g of the Carbamate Silane Coupling agent solution were brought together and stirred for 1 night at 80° C. The found solid content of the clear colloidal dispersion was 12.3%.

107.3 g of the obtained dispersion was mixed with 26.56 g of Setalux® 1760 VB64 to a clear solution and subsequently concentrated by evaporation under reduced pressure to 62.6 g clear premix solution containing 17 g Setalux® 1760 and 13.2 g carbamated nanosilica, both on solid base.

EXAMPLE 1

For the paint formulations firstly a premix was made from 136.72 g of polyacylate polyol Setalux® 1760 VB-64 from Nuplex Resins, 53.57 g of butylated formaldehyde/melamine resin Setamine® US 138 BB-70 from Nuplex Resins, 41 g of MAK (methyl amyl ketone) and 0.63 g of 10% Byk®-331 (a silicone surfactant additive) solution in MAK.

To 46.4 g premix, 0.10 g Byke®-358 (polyacrylate leveling agent) and 5.60 g MAK was added to bring the reference formulation without any nanosilica on a solid content of 48%.

To 46.4 9 premix, 0.12 g Byk®-358 and 10.30 g colloidal dispersion of example AA was added to a formulation comprising a solid content of 48% and with an amount of 10% nanosilica on the total amount of solids.

Coating compositions were sprayed onto Q-panels coated with a commercial primer and a commercial dark blue base coat. The base coat was applied in two layers with a 1 minute flash-off between the layers. The coating composition was applied after 5 minutes flash-off, also in two layers. After 10 minutes flash-off the complete system was baked for 30 minutes at 140° C.

Car wash resistance was determined according to the Renault method discussed above. The results hereof are summarized in Table 1.

TABLE 1

|  | Reference coating formulation (without coated particles) | Coating formulation with 10% coated silica of example AA |
|---|---|---|
| Initial Gloss 20° | 96 | 89 |
| Haze | 18 | 22 |
| After carwash End Gloss 20° | 77 | 80 |
| Delta loss of gloss 20° | 19 | 9 |
| % loss of gloss 20° | 20 | 10 |

Transmission Electron Micrographs (TEM) of the cross-section of the cured clear coat wherein 10% nanosilica reveals that particles are found enriched at the air-surface of the coated substrate. The surface area enriched with the coated particles has a thickness (measured perpendicularly from the surface of the cured coating) from a couple of nanometers to about 50 nm. Also the Si profile obtained with SIMS shows the enrichment.

Comparative Experiment 2

38.67 g of the premix of the comparative experiment DD was mixed with 6.44 g of Setamine US-1 38 BB-70, 0.68 g of a 10% Byk-358 in 2-heptanone and 0.45 g of a 10% Byk-331 in 2-heptanone. The weight % of carbamated nanosilica solid on total solids was 19%. The weight ratio of Setalux to Setamine on solid base is 70 to 30 respectively.

As reference 43.76 g of Setalux® 1760 VB-64 was mixed with 17.14 g of Setamine US-138 BB-70, 1.46 9 of a 10% Byk-358 in 2-heptanone, 0.90 g of a 10% Byk-331 in 2-heptanone, 5 g of butylglycolacetate and 16 g of Solvesso.

Films and carwash experiments were made as described in example 1. The results are summarized in Table 2.

TABLE 2

|  | Reference coating formulation (without coated particles) | Coating formulation with 19% modified nanosilica of comp. experiment DD |
|---|---|---|
| Initial Gloss 20° | 96 | 94 |
| After carwash End Gloss 20° | 78 | 73 |
| Delta loss of gloss 20° | 18 | 21 |
| % loss of gloss 20° | 19 | 23 |

The material prepared according to U.S. Pat. No. 5,853,809 (comparative experiment DD) contains nanosilica chemically modified with a coupling agent that enables reaction with the aminoresin that is part of the polymeric network. Although the dry scratch resistance might be improved by the use of such nanosilica, from the presented results it is obvious that this route does not lead to a better car wash scratch resistance. Study with TEM reveals that the particles are homogenously divided over the cured film

EXAMPLE 3

A first premix was made from 133.33 g of Setalux 1770® VS-70, 57.20 g of Setamine® US138 BB-70, 2.67 g of Nacure® 5225 (an amine blocked strong acid from King Industries) and 83.20 g of 2-heptanone. Premix B comprises 100 g of Setalux 1770® VS-70, 50 g of 2-heptanone, 38 g of example BB dispersion, 42.8 g of Setamine® US138 BB-70 and 2 g of Nacure® 5225.

The premix A was used to make with premix B 1 pack formulations containing 0 up to 5% coated nanosilica prepared according to example BB see table for compositions and dry scratch resistance results according to the Rota Hub method. The films were applied and cured in the same way as for as for example 1. The results are summarized in Table 3.

TABLE 3

|  | 0% silica (Reference) | 1% silica | 3% Silica | 5% Silica |
|---|---|---|---|---|
| Compositions | | | | |
| Premix A | 80 | 72.53 | 57.61 | 42.68 |
| Premix B | 0 | 7.47 | 22.39 | 37.32 |
| Byk-358 | 0.17 | 0.17 | 0.17 | 0.17 |
| 10% Byk 331 in 2-heptanone | 0.20 | 0.20 | 0.20 | 0.20 |
| Rota Hub Results | | | | |
| Initial Gloss 20° | 88.92 | 89.24 | 89.5 | 89.5 |
| After carwash End Gloss 20° | 86.08 | 89.86 | 88.98 | 87.84 |
| Delta loss of gloss 20° | 2.84 | −0.62 | 0.52 | 1.66 |
| % loss of gloss 20° | 96.8 | 100.7 | 99.4 | 98.1 |

The results in table 3 show that the Setalux 1770® 1 pack clear coating, which already has an intrinsically high scratch resistance under dry and wet conditions, can be made completely scratch resistant with as little as 1% coated nanosilica according to the invention. Enrichment of nanosilica at the surface is also shown here with TEM and SIMS.

EXAMPLE 4

Setalux 1903® BA-75 is a polyacrylate polyol mostly applied with polyisocyanate in 2 pack systems for car refinishes.

To 65.7 g of modified nanosilica of example BB, 27 g 2-heptanone and 240 g Setalux® 1903 BA-75 is added to get a bluish, clear premix solution with a solid content of 60%.

To 10 g of the premix, 1 g butylacetate, 0.4 g of 10% Byk-358 in 2-heptanone, 0.26 g of 1% dibutyltindilaurate (DBTL) in butylacetate and finally 2.64 9 of Tolonate® HDT LV (i.e. the isocyanurate of hexamethylene diisocyanate) from Rhodia was added. Molar amount of hydroxy and isocyanate groups were equivalent. The content of nanosilica on total silica was 6.9%.

Films with a thickness of 90 microns were drawn on Q-panels and glass plates and after a flash of 10' at room temperature treated for 30' at 60° C. and subsequently for 1 week at room temperature. Films were clear and the car wash scratch resistance was better than found for the reference without silica.

Comparative Experiments 5A, 5B and 5C

In the comparative experiments films made from three different compositions were compared with a film made in the example 4. Films were drawn on Q-panels and glass plates and after a flash of 10 min. at room temperature treated for 30 min. at 60° C. and subsequently for 1 week at room temperature. Compositions and analysis results are presented in Table 4.

TABLE 4

| Composition | 5A | 5B | 5C | 4 |
|---|---|---|---|---|
| Setalux 1903 | 7.2 | 7.2 | 7.2 | 7.2 |
| Polysiloxane Comparative experiment CC | 2.8 | 2.8 | — | — |
| Butyl-silica Preparation B | — | 2.6 | 2.6 | — |
| Dow Corning ® DC 4-7041 short chain diol, | — | — | 0.174 | — |
| TEOS | — | — | 0.106 | — |
| coated silica acc. the invention Example BB | — | — | — | 2.0 |
| Butylacetate | — | — | — | 1.8 |
| 10% Byk 358 in heptanone | 0.4 | 0.4 | 0.4 | 0.4 |
| 1% DBTL in Butylacetate | 0.26 | 0.26 | 0.26 | 0.26 |
| Tolonate HDT LV | 2.64 | 2.64 | 2.64 | 2.64 |
| % silica on total solids | 0 | 6.5 | 6.5 | 6.9 |
| Appearance cured film: | Turbid, bad wetting, craters | Turbid, bad wetting, craters | Good | Good |
| SIMS | | No enrichment of nanoparticles at the surface | | Enrichment of the particles at the surface |

The experiments show that the grafting modification reaction of the butyl-nanosilica with a blend of Dow Corning® DC 4-7041 short chain diol (i.e. PDMS) and TEOS results in a good appearance and, enrichment of silica at the surface. Comparative experiment 5A shows that the reaction product of PDMS and TEOS, i.e. in the absence of particles in a coating composition results in a coating having bad wetting and turbidity properties, even in the presence of separate butyl-nanosilica particles (Comparative experiment 5B). Formulation the butyl-nanosilica with PDMS and TEOS leads to clear films but no enrichment of the particles to the surface and no improvement of the scratch resistance.

EXAMPLE 6

1K and 2K paint formulations were prepared containing 0.5% and/or 1.0% of grafted silica using the coated colloidal silica dispersions of example EE, FF and GG. For the 1K formulations 82.0 g of Setalux® 1760 VB-64 was diluted with 11.7 g of methyl amyl ketone (MAK) and an amount of coated colloidal silica of examples EE, FF and GG was mixed in. Next 32.1 g of Setamine® US 138 BB-70 added and 0.38 g of 10% Byk®-310 solution in MAK. The formulation was thinned down with MAK to a spraying viscosity of 28 s DIN cup 4. The clear coats were sprayed on a blue solvent borne base coat and cured for 24 minutes at 140° C.

For the 2K formulations 72.1 g of Setalux® 1769 VV-65 was diluted with 21.5 g of methyl amyl keton and the appropriate amount of colloidal silica of example EE, FF and GG was mixed in. Next 0.38 g of 10% Byk®-310 solution in MAK was added and 0.68 g of 1% Tinstab® BL 277 in butyl acetate. Directly before spraying 31.25 g of a hardener solution consisting of 725.2 g Desmodur® N3390, 82.7 g Solvesso® 100 and 82.7 g of methoxypropyl acetate were added. The clear coats were sprayed on a blue solvent borne base coat and cured for 24 minutes at 140° C. and dried for 7 days at room temperature before testing. The results of the gloss retention obtained by the crockmeter test are summarized in Table 5.

TABLE 5

| | Crock meter Gloss Retention (GR) (%) - | | | |
|---|---|---|---|---|
| | Silica* [%] | GR** [%] | Silica* [%] | GR** [%] |
| 1K | | | | |
| Reference | 0 | 47 | 0 | 47 |
| EE | 0.5 | 82 | 1.0 | 86 |
| FF | 0.5 | 77 | 1.0 | 81 |
| Reference | | | 0 | 43 |
| GG | 0.5 | Not determined | 1.0 | 74 |
| 2K | | | | |
| Reference | 0 | 32 | 0 | 32 |
| EE | 0.5 | 67 | 1.0 | 74 |
| FF | 0.5 | 69 | 1.0 | 75 |

*% silica is the weight percentage of coated silica solids (i.e. including the grafted coating) on the total solids weight of the coating formulation.
**Gloss Retention is the percentage of the retained gloss of the abraded area as measured in the crockmeter test based on an average of five measurements at five differents spots.

Example 6 shows that the grafted coating modification of silica nanoparticles according to the claims is essential for obtaining improved gloss retention (GR [%]) in the crockmeter test.

EXAMPLE 7

9 g of Setalux 1770 containing 6.3 g solids, 0.9 g of 2-ethoxy-ethylpropionate and 0.32 g of a 29% of Aldrich/TEOS coated nanosilica in MAK prepared according to example HH, were mixed. Then 1 g Solvesso100 and 3.86 g of Setamine US138 were added and the whole was mixed. Further 2 g of Solvesso 100 and 0.18 g of Nacure 5225 was mixed in. The clear formulation contained 1 w/w% (on solids) coated silica and was drawn on glass with a wet layer thickness of 120 micron. After the usual 10 minutes flash-off and 30 minutes of baking at 140° C. this resulted in a clear coating.

A hazy films is obtained if in the coating composition of Example 7, 3.5% coated nanosilica according to Example HH (comprising polysiloxane with n=7) is used. Hazy films can also be obtained when for 1% coated silica a higher amount of Aldrich/TEOS than in the example HH is used.

The example show that haziness of a coating tends to increase with increasing length of the polysiloxane, with increasing amount of polysiloxane in the coated particles and with increasing amount of coated particles in the coating composition.

TOF-SIMS analyses on a 1% clear film applied on a Q panel revealed Si enrichment which is about 30% lower for the Aldrich/TEOS nano silica than for Dow Corning/TEOS grafted nanosilica. From these observations one concludes that the Dow Corning® DC 4-7041 short chain diol has a superior performance as compared to the Aldrich product with a higher n value.

The invention claimed is:

1. Coated particles comprising particles having a surface with hydroxy functional groups and a crosslinked polysiloxane coating comprising a reaction product of polysiloxane disilanol according to formula I:

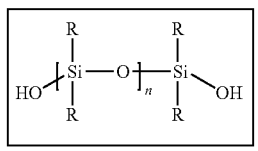

wherein n is 1 to 25, and wherein each R is a same or different hydrocarbon group, and a coating crosslinking agent which polysiloxane coating is at least partly grafted to the particle surface by reaction with the hydroxy functional groups on the particles and wherein the coating crosslinking agent is an alkoxysilane having the structure $[R'O]_m$—Si—$[R'']_{4-m}$ wherein m=3 or 4 and R' and R'' are hydrocarbon groups.

2. The coated particles according to claim 1, wherein the coating crosslinking agent is a mixture of alkoxy silanes with an average number of alkoxy groups between 2.5 and 4.

3. The coated particles according to claim 1, wherein the molar ratio of the coating crosslinking agent relative to the polysiloxane disilanol is between 2 and 0.1.

4. The coated particles according to claim 1, wherein the particles have an average diameter between 1 and 400 nanometers.

5. The coated particles according to claim 1, wherein the weight fraction of particles in the coated particles is between 30 and 99 weight percentage relative to the total weight of the coated particles.

6. The coated particles according to claim 1, wherein the particles have an average diameter between 4 and 50 nanometers and wherein the weight fraction of the particles in the coated particles is between 50 and 99 weight percentage relative to the total weight of the coated particles.

7. The coated particles according to claim 1, wherein the particles are chosen from the group of silica, alumina, zirconia, titania and hybrids thereof, glass, mineral or synthetic clay, zeolite and organic particles having hydroxyl groups on the surface of the particle.

8. The coated particles according to claim 1, wherein the particles are silica particles wherein the polysiloxane disilanol is bonded to the silica particles over an [—Si—O—Si—] bond.

9. The coated particles according to claim 1, wherein the polysiloxane disilanol has an average number of siloxane groups n between 1 and 10.

10. The coated particles according to claim 1, wherein the hydroxy functional groups on a surface of the particles are partly esterified with an alcohol.

11. The coated particles according to claim 1, wherein the hydrocarbon on the polysiloxane disilanol is an alkyl having 1-4 carbon atoms.

12. Coated particles according to the invention comprising nanosilica particles having a surface with hydroxy functional groups optionally partly esterified and a polysiloxane coating comprising a reaction product of polysiloxane disilanol according to formula I:

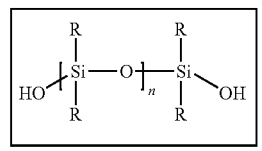

wherein n is 1 to 25, and wherein each R is a same or different hydrocarbon group having 1-4 carbon atoms, and as a coating crosslinking agent an alkoxysilane having the structure $[R'O]_m$—Si—$[R'']_{4-m}$ wherein m=3 or 4, and wherein R' and R'' are hydrocarbon groups, which polysiloxane coating is at least partly grafted to the particle surface by reaction with the hydroxy functional groups on the particles, wherein the molar ratio of the coating crosslinking agent relative to the polysiloxane disilanol is between 2 and 0.1, wherein the particles have an average diameter between 4 and 50 nanometers and wherein the weight fraction of the particles in the coated particles is between 50 and 99 wt.% (relative to the total weight of the coated article) and wherein the hydrocarbon on the polysiloxane disilanol is an alkyl having 1-4 carbon atoms.

13. A method for the preparation of coated particles, wherein a crosslinked polysiloxane coating is grafted onto the particles having a surface with hydroxyl functional groups by reaction with the hydroxy functional groups on thereof, comprising:

reacting organic modified particles in an aprotic organic colloidal dispersion ('organosol'), with a. a polysiloxane disilanol according to formula I:

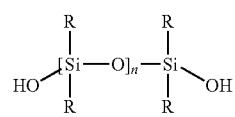

wherein n is 1 to 25, and wherein each R is same or different hydrocarbon group and b. an alkoxysilane having the structure $[R'O]_m$—Si—$[R'']_{4-m}$ wherein m=3 or 5 and R' and R'' are same or different hydrocarbon groups.

14. The method according to claim 13, wherein the organosol is prepared by:

a) providing particles dispersed in water (hereinafter an 'aquasol'), b) adding to the aquasol an organic reactant to react with at least a part of the hydroxy functional groups on the surface of the particles to form organic modified particles, c) providing to the organic modified particles an aprotic organic solvent, d) removing water during and/or after step b) and/or c).

15. The method according to claim 14, wherein the organic reactant is an alcohol and wherein the alcohol is replaced by the aprotic solvent.

16. The method according to claim 13, wherein the alkoxysilane has an average number of alkoxy groups m between 2.5 and 4.

17. The method according to claim 13, wherein the molar ratio of the alkoxy silane relative to the polysiloxane disilanol is between 2 and 0.8.

18. A colloidal dispersion of coated particles obtained by the method of claim 13.

19. The method of claim 13, further comprising manufacturing a polymer composition comprising the coated particles.

20. The colloidal dispersion according to claim 18, further comprising a crosslinkable binder.

\* \* \* \* \*